(12) United States Patent
Robinson et al.

(10) Patent No.: US 8,076,796 B1
(45) Date of Patent: Dec. 13, 2011

(54) ADAPTIVE POWER SUPPLY FOR TELECOMMUNICATIONS NETWORKS

(75) Inventors: Steven M. Robinson, Madison, AL (US); Jeremy Zoller, New Market, AL (US)

(73) Assignee: Adtran, Inc., Huntsville, AL (US)

( * ) Notice: Subject to any disclaimer, the term of this patent is extended or adjusted under 35 U.S.C. 154(b) by 190 days.

(21) Appl. No.: 12/535,061

(22) Filed: Aug. 4, 2009

(51) Int. Cl.
*H02J 1/00* (2006.01)
*H02J 1/04* (2006.01)

(52) U.S. Cl. .......................................... 307/31; 307/150

(58) Field of Classification Search .................... 307/31, 307/150
See application file for complete search history.

(56) References Cited

U.S. PATENT DOCUMENTS

| | | | |
|---|---|---|---|
| 4,373,117 A | 2/1983 | Pierce | 179/2 DP |
| 4,592,069 A | 5/1986 | Redding | 375/8 |
| 5,655,010 A | 8/1997 | Bingel | 379/93.28 |
| 5,799,069 A | 8/1998 | Weston et al. | 379/93.33 |
| 6,160,806 A * | 12/2000 | Cantwell et al. | 370/360 |
| 6,212,274 B1 | 4/2001 | Ninh | 379/413 |
| 6,222,660 B1 | 4/2001 | Traa | 359/189 |
| 6,388,514 B1 | 5/2002 | King et al. | 330/10 |
| 6,542,660 B1 * | 4/2003 | Medin et al. | 385/24 |
| 6,580,254 B2 | 6/2003 | Schofield | 323/234 |
| 6,693,810 B2 | 2/2004 | Robinson et al. | 363/97 |
| 6,757,382 B1 | 6/2004 | Wilkes, Jr. et al. | 379/399.01 |
| 6,917,681 B2 | 7/2005 | Robinson et al. | 379/387.01 |
| 6,924,566 B2 | 8/2005 | Robinson et al. | 307/38 |
| 6,967,522 B2 | 11/2005 | Chandrakasan et al. | 327/534 |
| 6,982,860 B2 | 1/2006 | Smith et al. | 361/119 |
| 7,088,197 B2 | 8/2006 | Brosh et al. | 331/186 |
| 7,233,868 B2 | 6/2007 | Luo et al. | 702/64 |
| 7,302,047 B1 | 11/2007 | Tidwell et al. | 379/22.03 |
| 7,319,358 B2 | 1/2008 | Senthinathan et al. | 327/538 |
| 7,508,930 B2 | 3/2009 | Smith et al. | 379/395.01 |
| 2004/0119339 A1 | 6/2004 | Sytwu | 307/28 |
| 2006/0092961 A1 | 5/2006 | Sclater et al. | 370/421 |
| 2006/0193267 A1 * | 8/2006 | Dhar et al. | 370/264 |
| 2006/0259616 A1 * | 11/2006 | Lester | 709/224 |
| 2007/0058084 A1 | 3/2007 | Luo et al. | 348/730 |

* cited by examiner

*Primary Examiner* — Jared Fureman
*Assistant Examiner* — Adi Amrany
(74) *Attorney, Agent, or Firm* — Allen, Dyer, Doppelt, Milbrath & Gilchrist, P.A.

(57) ABSTRACT

An adaptive power supply span powers devices used in telecommunications. It includes a power circuit and control circuit that receives power and sense signals therefrom and provides a control signal thereto and distinguishes between a first network interface load having a constant voltage input power requirement and a second network interface unit load having a constant current input power requirement. A voltage control circuit and current control circuit are interconnected together and connected to the power circuit. A control signal from the voltage control circuit and current control circuit extends to the power circuit. The control circuit maintains a fixed output voltage for constant voltage regulation for the first network interface unit load, if the output current remains below a threshold current. The circuit limits the output current to a regulated value for constant current regulation below the initial maximum value for powering a second network interface unit if the initial output current is greater than the threshold current for a time greater than a threshold time.

20 Claims, 5 Drawing Sheets

ADAPTIVE POWER SUPPLY FOR TELECOMMUNICATIONS NETWORKS

FIELD OF THE INVENTION

The present invention relates to power supplies used in communication networks, and more particularly, the present invention relates to power supplies used for span powering Network Interface Unit (NIU) loads in telecommunications networks.

BACKGROUND OF THE INVENTION

In some telecommunication networks, span powering is used when a power supply located at a service provider site, such as a central office, furnishes power to a remote site. Typically, a service provider furnishes power to equipment at the remote site near the customer premise from the power supply at the service provider site. In some communications networks, a pair of wires, often referred to as the copper twisted pair, couples both a communications signal and the power supply energy from the service provider site to the remote site. In other telecommunications systems, the twisted pair of wires serves only as an electrical path for coupling power from the service provider site to the remote site.

When span powering a remote DS1 device, for example, a DS1 power supply at the local site furnishes, via the twisted wire pair, a desired current and voltage to the remote site for powering a DS1 device. In some applications, it is desired to span power a DS3 NIU located at a remote site from the local site over twisted pair. Because of the differences in power requirements between the DS1 and DS3 devices, a power supply capable of powering a DS3 device must be used at the local site. A DS1 span power supply does not have the appropriate output to power a DS3 device. Hence, for span powering, a local DS1 power supply is required for a DS1 communications connection and a local DS3 power supply is required to span power a DS3 NIU. These power supplies are not interchangeable.

The assignee of the instant application, ADTRAN, Inc., designs and manufactures a Span Power and Protection Module (SPPM) that receives and isolates up to 28 DS1 signals, combines these signals with isolated T1-style (60 mA regulated) span power, and couples the combined span power/DS1 signal to traditional copper, twisted pair telephone line to power and drive a DS1 Network Interface Unit (DS1 NIU). In this SPPM, the T1 style span power is generated by 28 identical isolated span power supplies, which regulate their respective output currents to a nominal 60 mA, in one non-limiting example. This value is held in conjunction with the DS1 network interface units that terminate their span power input with a shunt device, for example, a zener diode to define the NIU operating voltage.

As noted before, the SPPM provides DS1 span power capability, but is not capable to span power a DS3 NIU. The powering requirements for a DS3 NIU are substantially different than those of a DS1 NIU. DS3 NIUs are typically powered using a constant voltage instead of constant current and the current requirements (thus total power requirements) are much higher than those of a DS1 NIU.

A possible solution is to change the SPPM so that several of its 28 powering ports would be "DS3 only." This approach, however, suffers the disadvantages of losing availability from those "DS3 only" ports for the more common DS1 NIU application and could result in the destruction of a DS1 NIU should it be inadvertently connected to a DS3-designated powering port. This is unacceptable in practice.

Another possible solution changes the SPPM to incorporate a span power supply that powers either a DS3 NIU or DS1 NIU using a user-accessible switch that allows a user to select a desired mode of operation. This switchable-mode, span power supply would be used in several of the 28 ports with the original DS1-only span power supply used in the remaining ports. This approach, however, is not automatic and requires direct user intervention. Also, as a further disadvantage, a DS1 NIU could be destroyed, if the user does not put the mode-select switch in the appropriate position for the equipment to be powered.

SUMMARY OF THE INVENTION

An adaptive power supply span powers devices used in telecommunications such as supplying span power to Network Interface Units (NIU). The adaptive power supply includes a power circuit, a control circuit, and a line filter and distinguishes between a first network interface load having a constant voltage input power requirement and a second network interface unit load having a constant current input power requirement that is less than the maximum input current required by the first network interface unit load. A voltage control circuit and current control circuit are interconnected together and are connected to the power circuit. A control signal from the voltage and current control circuits is connected to the power circuit via a feedback element such as an optocoupler. The control circuit maintains a fixed output voltage (voltage regulation) to power a first network interface unit load, if the output current remains below a threshold current. The control circuit limits the output current to a regulated value (current regulation) for powering a second network interface unit if the initial output current is greater than the threshold current for a time greater than a threshold time value.

The adaptive power supply also includes a hysteretic current select circuit connected to the current control circuit to set a regulated current value. It includes a comparator circuit that receives a reference signal and a current sense signal and compares the signals and outputs a signal to the current control circuit and reduces the output current regulation value to a lower level for powering a second interface unit load. The voltage and current control circuits are formed as operational amplifier circuits that compare reference signals to sense signals and amplify the difference to output a control signal.

In yet another aspect, a first interface unit load is a DS3 network interface unit (NIU) and a second network interface load is a DS1 network interface unit (NIU). A line filter can be connected to the output of the dual mode power supply for filtering the power output for use with either first or second network interface unit loads. An optical circuit within the power circuit can connect the control circuit to the power circuit. The power circuit can also be formed as a power transformer, a modulator and drive circuit, a first regulator circuit that derives power from the transformer to provide power to the modulator and drive circuit over a wide operating range, a second regulator circuit that also derives power from the transformer to power the control circuit over a wide operating range, and a main power output from the transformer for powering first and second network interface units.

BRIEF DESCRIPTION OF THE DRAWINGS

Other objects, features and advantages will become apparent from the detailed description which follows when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with non-limiting examples, the adaptive power supply powers a DS3 or DS1 Network Interface Unit (NIU). The adaptive power supply automatically determines and applies the proper type of powering required by the network interface unit load. The adaptive power supply reacts to the response of the two different NIU load types (DS1 or DS3) and adjusts its output accordingly. It is possible to use this dual mode power supply in different ports of the 28 total power supply ports of the SPPM and provide a customer full 28 ports of isolated DS1 signaling and power, or provide up to an "n" number of ports of isolated DS3 power. The remaining ports would only be available for DS1 signaling and power. No user intervention would be required and this selection between providing power to a DS1 or DS3 NIU load becomes automatic. In addition, each dual mode power port can be sized to power two DS3 NIU loads.

The adaptive power supply operates as an adaptive span power supply at the local (or service site) and can provide power to a remote DS1 NIU, or provide power to up to two remote DS3 NIUs, in a non-limiting example. The delivered voltages and currents provide this power to either a DS1 or DS3 NIU load without causing harm to either type. For conventional communication systems having these different types of span powering requirements, the adaptive power supply to be described below is advantageous and overcomes many of the drawbacks identified above.

Figure 1:
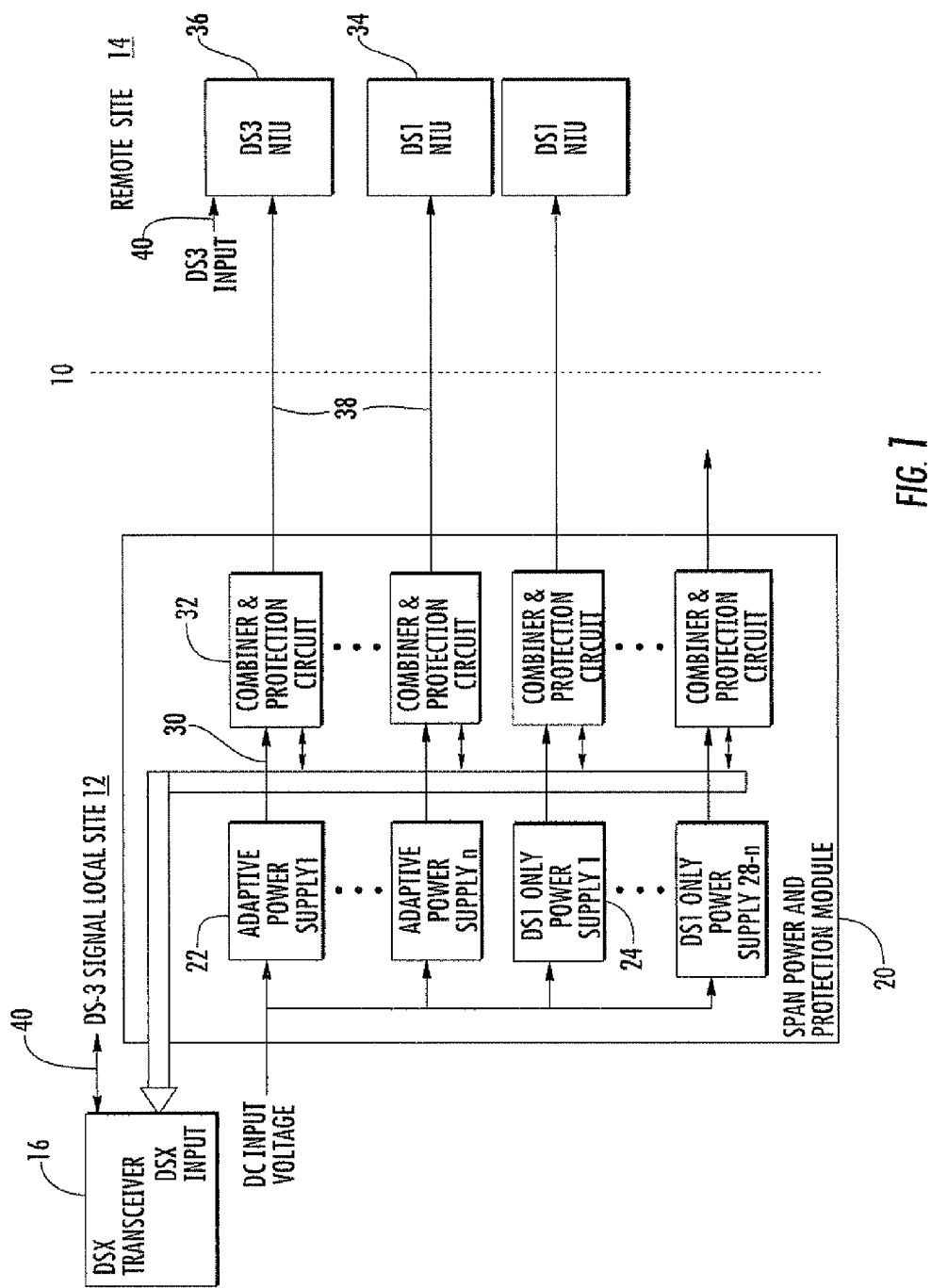
FIG. 1 is a block diagram showing a communications system that incorporates an enhanced Span Power and Protection Module (SPPM) at a local/service site in which the SPPM includes an adaptive power supply that powers a DS3 or DS1 Network Interface Unit (NIU) load and automatically determines and applies the appropriate power required by the NIU load.

FIG. 1 is a high-level block diagram of a communications system 10 showing a local/service site 12 and a remote site 14. The local/service site 12 includes DS1 and/or DS3 transceivers 16 as known to those skilled in the art. An enhanced Span Power and Protection Module is illustrated at 20 and includes at least one adaptive power supply 22 (typically an "n" number) for powering a DS1 or DS3 NIU and a plurality of power supplies 24 formed as the standard power supplies for powering a DS1 NIU. A plurality (or "n" number) of adaptive power supplies 22 are typically incorporated within the Span Power and Protection Module at various ports. In one example, three are used. The adaptive power supply 22 has a power output 30 that varies and can be used for powering a DS3 NIU or DS1 NIU located at a remote site. For example, the power output 30 could be at a voltage and current combination for powering a DS1 NIU 34 and output power into a combiner and protection circuit 32, which also receives a signal from a DS1 transceiver, combines the power and signal, and passes the combined power and signal to the DS1 NIU 34 via twisted wire pair telephone cable 38. In a mode of operation for powering a DS3 NIU, however, the adaptive power supply 22 outputs power to a combiner and protection circuit but no DS3 signal is present so only power is delivered over the twisted pair to the DS3 NIU 36 at the remote site. The DS3 circuit receives communications signals typically over a coaxial cable 40 from a DS3 transceiver. The DS3 and DS1 NIUs have different power requirements as indicated above and require different types of power input.

It should be understood that Digital Signal One (DS1) signalling (also known as a T1 and sometimes a "DS-1" signal) for a T-carrier signalling system uses a DS1 frame synchronization to identify different time slots within a 24-channel frame as indicated above. Each DS1 circuit is made from 24 eight-bit channels as time slots or Digital Signal Zero (DS0) basic digital signalling rate of about 64 Kbit/s corresponding to the capacity of one voice and frequency equivalent channel. Digital Signal Level 3 corresponding to DS3 as indicated above equates to 28 T-1 lines for a total signalling rate of about 1.544 mbps and multiplexed through an M13 with 188 additional signalling and control bits to each T-3 frame. Each frame is transmitted at about 8,000 times a second for a total T-3 signalling rate of about 44.736 Mbps. Different components as shown in FIG. 1 can be used such as manufactured by ADTRAN, Inc. of Huntsville, Ala. These components include an enhanced span power protection module for 28 transmit and receive DSX-1 facilities. This enhanced SPPM module includes at least one adaptive power supply 22 as indicated above for at least one communications port and operable with a DS1 or DS3 network interface unit for demarcation and a loopback point for DS1 and DS3 circuits. The network interface units can serve as an interface between a T1 metallic span and customer premises equipment (CPE) and provide maintenance loopback plus collection and reporting of DS1 performance statistics. A DS3 network interface unit can respond to DS3 loopback codes.

The span power and protection module protects up to 28 DSX-1 transmit and receive facilities against outside plant lightning and power fault events. The system can be used with digital subscriber line (DSL) communication systems or other systems known to those skilled in the art.

In accordance with a non-limiting aspect, the characteristics of the two different types of equipment, DS1 NIU or DS3 NIU, to be powered are leveraged. A dual mode control circuit, also termed as an automatic identification (ID) and feedback and control circuit, takes advantage of the differences of the loads required by the DS1 or DS3 NIUs and adjusts the output of the adaptable power supply for each load type, thus working as an adaptable span power supply. Details of such circuits are explained below with reference to FIGS. 5 and 6.

Figure 5:
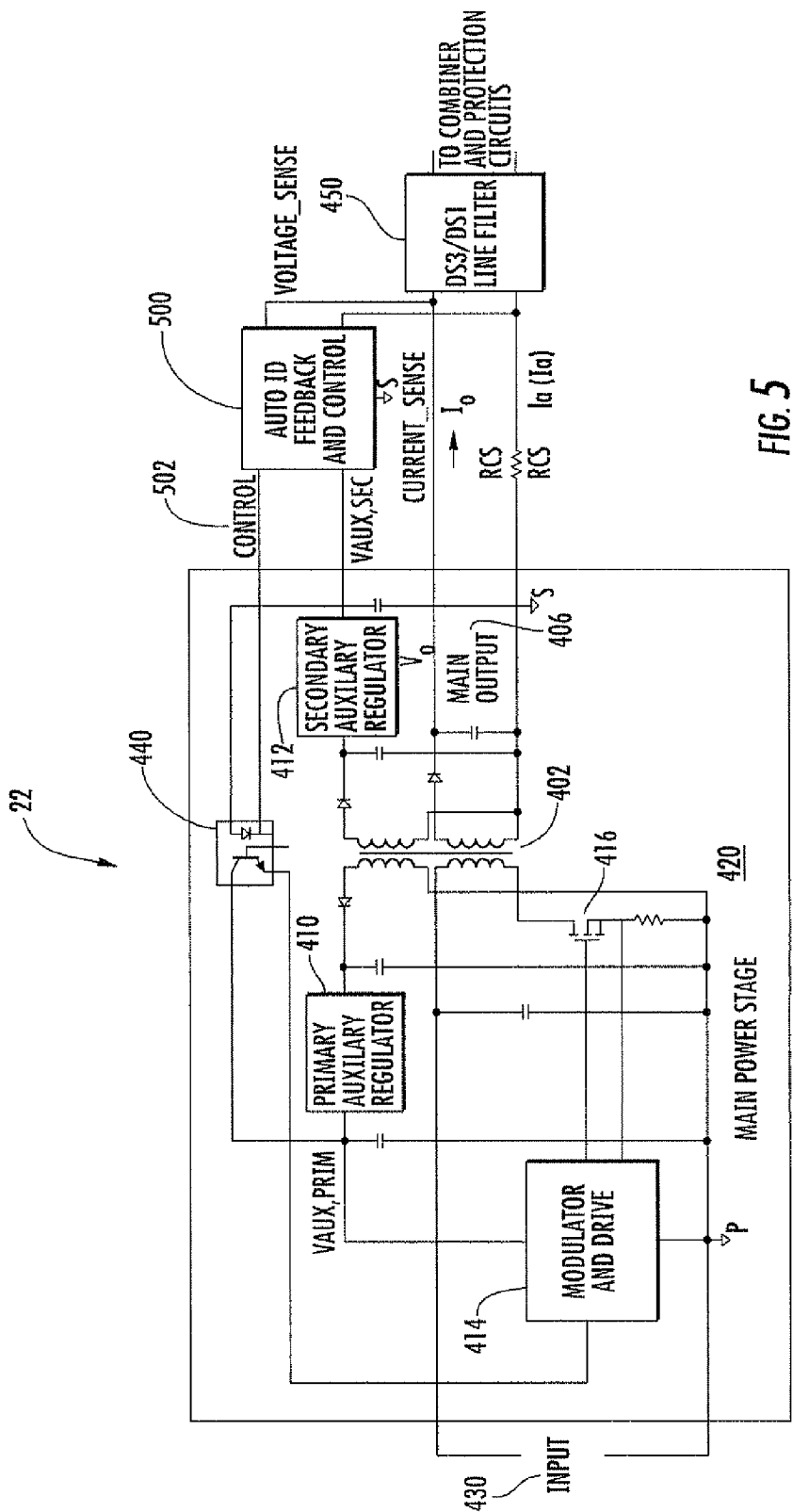
FIG. 5 is a high-level schematic circuit diagram of an adaptive power supply that can be used in the communications system and as part of an associated SPPM shown in FIG. 1 in accordance with a non-limiting example.
Figure 6:
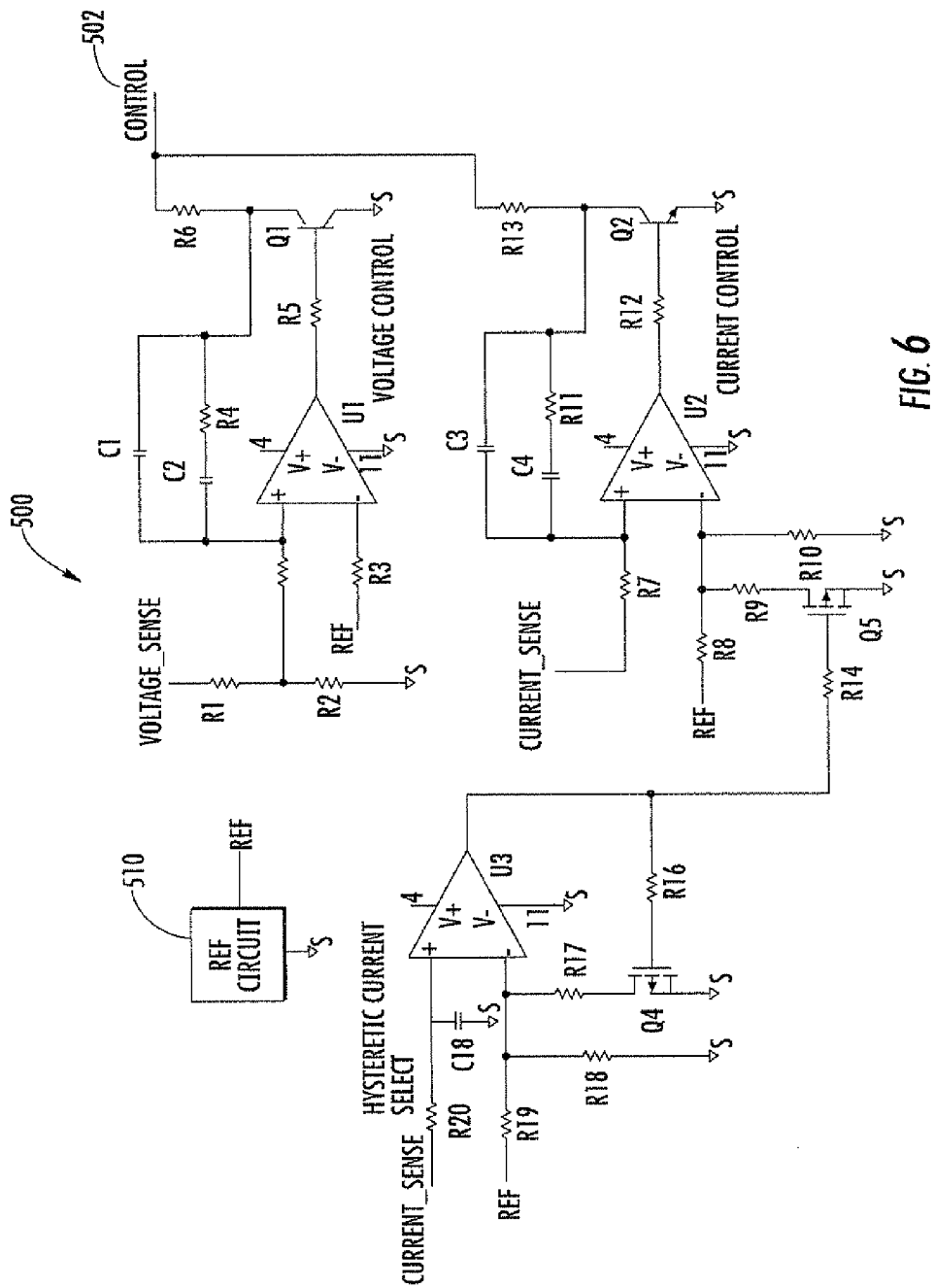
FIG. 6 is a schematic circuit diagram of the automatic identification (ID) feedback and control circuit (control circuit) shown in FIG. 5 and used with the adaptive power supply in accordance with a non-limiting example.

FIG. 5 shows the adaptive power supply and the feedback and control circuit (termed also generally as the control circuit) is shown in FIG. 6 at reference numeral 500 and will be explained in greater detail with reference to FIG. 6 after a more general discussion of the adaptive power supply.

The initial mode of the control circuit 500 is voltage regulation. In one non-limiting example, the adaptive power supply 22 (FIG. 5) output is monitored and regulated to a maximum, open-circuit voltage value. The control circuit 500 maintains this output voltage from zero output current to a predetermined maximum output current limit (Imax). If the output current increases to Imax, the feedback and control circuit 500 initially regulates the output current to Imax. In the example circuit, Imax is nominally 600 mA, but can be any value. The control circuit 500 also has a current threshold (Ith) that activates a circuit that sets the output current regulation value as explained in greater detail below. Ith must be lower than Imax and is typically 500 mA in the example circuit. When the load current exceeds Ith for a predetermined amount of time, the output current regulation value is reduced from Imax to a lower level, Ireg. In this example circuit, Ireg is about 60 mA, typical of T1 powering circuits, but it can be any value lower than Ith.

When the output of this dual mode adaptive power supply 22 (as a span power supply, for example) is connected to one or two DS3 NIUs, the NIUs operate normally from the regulated 54V output, drawing less current than Ith as the current threshold. In this case, the dual mode adaptive power supply 22 operates as a constant voltage (voltage regulated) power supply.

A DS1 NIU typically has a shunt, voltage clamp device, for example, a zener diode or transient voltage protector, across its span power input voltage terminals. This clamping voltage is typically about 20V-30V. When a DS1 NIU is connected to the dual mode adaptive power supply 22 as a span power supply, the shunt voltage clamping device of the DS1 NIU pulls the output current of the span power supply to its maximum current limit value Imax. The output voltage falls to the clamp voltage plus the voltage drop in the resistive distribution lines. After a brief period of operation at Imax, the hysteretic feature of the feedback and control circuit 500 reduces the output current to Ireg. The adaptive power supply 22 continues its operation as a constant current regulating supply. The period of time that the DS1 NIU is operating at Imax instead of Ireg is brief (<20 ms typically) and well within the safe operating area of devices used for a DS1 NIU input voltage clamping. Thus, it is possible to maintain full product flexibility, i.e., powering either DS3 NIUs or a DS1 NIU, without operator intervention, while also reducing any associated reliability risks due to operator error.

Figure 2:
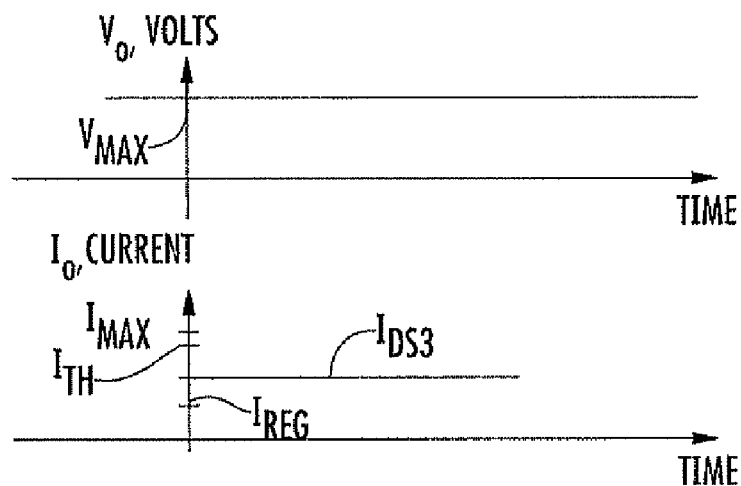
FIG. 2 is a graph depicting voltage and current characteristics of the adaptive power supply when furnishing power to a DS3 NIU load in accordance with a non-limiting aspect.

FIG. 2 is a graph showing the output voltage, Vo, and current Io of the adaptive power supply 22 when the supply is connected to a remote DS3 NIU 36 which is also connected to an associated transceiver. When the adaptive power supply 22 is turned on, a voltage ($V_{MAX}$) of approximately 54 volts, in one embodiment, appears across the output terminals. For other embodiments, other values for Vmax are possible. No current flows from the power supply until the twisted pair is connected to the remote network interface unit, as indicated by time=0. When the adaptive power supply 22 is connected to an NIU over the wire pair, current will flow between the adaptive power supply and the remote site NIU. When the remote equipment is one or two DS3 NIUs, the current supplied by the adaptive power supply 22 will be less than Ith. Since the output current Io is less than a threshold current value, $I_{TH}$, then the voltage output of the adaptive power supply remains at $V_{MAX}$ as shown in FIG. 2. In one embodiment, $I_{TH}$ is 500 milliamps. The remote DS3 power supply, receiving power over the twisted pair, receives a current of around 300 milliamps at a voltage somewhat less than $V_{MAX}$ because of the voltage drop on the twisted pair.

Figure 3:
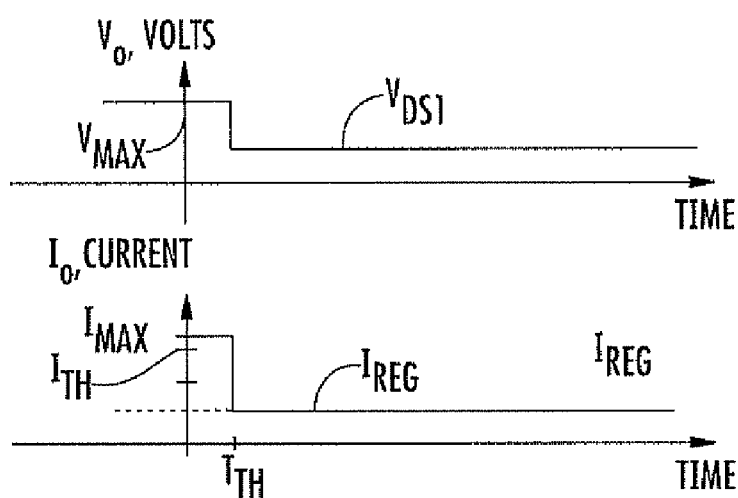
FIG. 3 is a graph depicting voltage and current characteristics of the adaptive power supply when furnishing power to a DS1 NIU load in accordance with a non-limiting example.

FIG. 3 is a graph depicting operation and function when the adaptive power supply 22 is coupled to a remote DS1 NIU over a twisted wire pair. If the current furnished by the adaptive power supply remains greater than $I_{TH}$, as seen in the graph of FIG. 3, for a threshold amount of time $T_{TH}$ then the output current is limited to and regulated at $I_{REG}$. In one embodiment $I_{REG}$ is equal to around 60 milliamps. The value of 60 milliamps is an example of a typical current value required of a remote DS1 NIU. In other embodiments, $I_{REG}$ has other values. The voltage across the terminals of the adaptive power supply 22 will drop from $V_{MAX}$ to a value that is equal to the voltage across the remote DS1 NIU plus the voltage drop on the twisted pair. For one embodiment $T_{TH}$ is approximately 20 milliseconds although other values are possible. The value of $T_{TH}$ is selected to provide sufficient time to charge the input capacitance of a DS3 NIU without changing the mode of operation.

Figure 4:
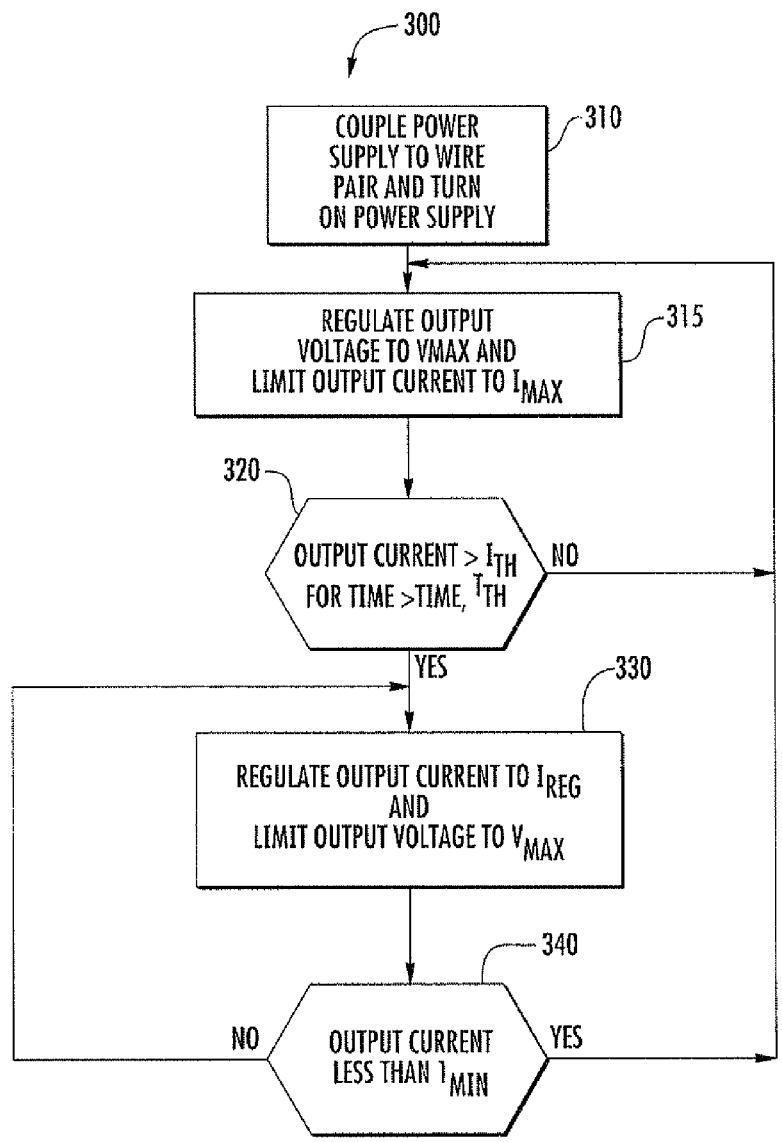
FIG. 4 is a high-level flowchart depicting a method used for operating the communications system and as part of an associated SPPM shown in FIG. 1 in accordance with a non-limiting example.

FIG. 4 shows a high-level flowchart of a method of operation and function that can be used in accordance with the non-limiting examples. The process begins at 300. After the adaptive power supply 22 is coupled to a remote NIU via the twisted wire pair 38, the adaptive power supply 22 is turned on (block 310). Current flows to the remote NIU on the twisted wire pair. Initially, the control circuit of the adaptive power supply 22 maintains the output voltage at a value of $V_{MAX}$ and limits the output current to $I_{MAX}$ (block 315). The output current, Io, of the adaptive power supply may be less than $I_{MAX}$. If the output current is greater than $I_{TH}$ for a period of time $T_{TH}$, then the YES path of decision (block 320) is followed. However, if the current does not exceed $I_{TH}$, then the adaptive power supply continues output voltage regulation (block 315). If the YES path of block 320 is taken, then the adaptive power supply limits the output current to $I_{REG}$, which results in a drop of the output voltage to some value less than $V_{MAX}$ (block 330). When this state of operation as described by block 330 is reached, a DS1 NIU is being powered. If the DS1 NIU is disconnected, then the current from the adaptive power supply 22 drops to a small value that is typically less than $I_{MIN}$ and operation of the adaptive power supply returns to block 315.

There now follows a description of the adaptive power supply 22 with reference to FIG. 5, which illustrates a simplified schematic circuit diagram of the adaptive power supply that operates as a dual mode adaptive power supply when used as a span power supply for DS1 or DS3 NIUs. Reference numerals for the different components will be given in the 400 and 500 series.

The dual mode characteristics are implemented by the control circuit 500 that is shown in the schematic circuit diagram in FIG. 6 and corresponds to an automatic identification (ID) feedback and control circuit labeled in FIG. 5 at 500. In a non-limiting, preferred embodiment, the adaptive power supply 22 uses a flyback converter designed for a wide range of outputs for the main power stage. The design and implementation of the flyback converter main power stage 420 is well known to those skilled in the art of power electronics and will not be described herein. Other embodiments of the main power stage are obvious to those skilled in the art. To accommodate the wide range of output voltages, primary and secondary side auxiliary voltages are regulated to power the modulator and drive circuit 414 and control circuit 500. The primary auxiliary regulator 410 and the secondary auxiliary regulator 412 are formed in one embodiment as linear emitter-follower circuits but can be formed in numerous other circuits well known to those skilled in the art.

As shown in FIG. 5, the main power stage 420 provides power to the control circuit 500 and the main output 406. The main output is coupled to a line filter 450 through a resistor Rcs which is used to sense the output current, producing a current sense voltage Current_Sense. Voltage_Sense, which is identically the output voltage Vo of the main output 406, and Current_Sense are connected to the control circuit 500 which is shown in FIG. 6 including the schematic connection points for Current_Sense and Voltage_Sense. The output of the control circuit 500 is a control signal Control that is connected to the main power stage 420 to provide voltage and current control of the main output 406. The output of the line filter 450 is the final output of the adaptive power supply and is connected to the combiner and protection circuit 32 as shown in FIG. 1 where it is joined with a DS1 signal for DS1 application and connected to a twisted wire pair 38 for conveyance to a remote NIU 34/36. For DS3 application, no signal is presented to the combiner and protection circuit 32 but power only is connected to a twisted pair for powering a DS3 NIU.

In a preferred aspect, the control circuit 500 shown in FIG. 6 is implemented using a quad (four) operational amplifier integrated circuit and a reference voltage circuit, but for clarity, FIG. 6 depicts individual operational amplifiers.

The voltage control function is implemented with the U1-based circuit shown in FIG. 6. Resistors R1 and R2 divide the main power stage 420 output voltage Vo (shown as Voltage_Sense) to compare to the reference voltage at U1 configured in conjunction with Q1 as a transconducting error amplifier circuit. The reference voltage (REF) is generated by a reference circuit 510 shown in FIG. 6. The reference voltage can be generated by many different circuits well known those skilled in the art. The error voltage output of U1 is translated to a current by R5 and transistor Q1. This current and the current drawn by R13/Q2 as described below are joined to form a control signal Control and are connected to the power circuit via 502 also shown in FIG. 5. Negative feedback for U1 comes from the voltage drop made by the current conducting in R6 coupled to the non-inverting terminal of U1 through a compensation network formed by R4, C1, and C2. The control signal is translated to the primary of the main power stage and coupled to the modulation and drive circuit 414 of FIG. 5 via an optical coupler circuit 440 shown in FIG. 5. This circuit 440 could be associated with the control circuit 500, but is shown within the main power stage in FIG. 5. If Voltage_Sense is less than the prescribed regulated value, then U1 output voltage is nearly zero and the voltage control function is inactive.

The current control function is implemented with the U2-based circuit shown in FIG. 6. The output current Io of the main output is translated to a current sense voltage via a current sense resistor Rcs shown in FIG. 5. The current sense voltage is coupled to U2 via R7 and is compared to the voltage at the inverting terminal of U2, which is the REF signal scaled down by R8 and R10. Transistor Q5 is initially open so R9 does not affect the voltage at the inverting terminal of U2. If the adaptive power supply output current increases to the maximum level Imax, then the U2 output becomes positive and causes transistor Q2 to conduct, adding to the current drawn by Q1. The control signal Control comprises the combined currents of R6/Q1 and R13/Q2 and its value controls the output voltage Vo or output current Io of the main output 406.

As the current in R13/Q2 increases, the main power stage output voltage decreases, and the U1 output decreases until transistor Q1 no longer conducts. At this point, operation has transitioned from constant voltage regulation to constant current regulation. Negative feedback for U2 is generated by the voltage drop across R13 from the current drawn by transistor Q2. This voltage drop is coupled to the non-inverting terminal of U2 via the compensation network formed by R11, C4, and C3.

The current sense voltage (Current_Sense) is also used by a hysteretic current select circuit that includes an operational amplifier U3 (operating as a comparator) and its associated circuit as a hysteretic current select function to set the regulated current value. If Current_Sense is greater than the voltage at the inverting terminal of U3, formed by REF, R18, and R19, for a long enough period of time to overcome the delay presented by R20 and C18, then the output voltage of U3 will transition high, turning on transistors Q4 and Q5 through their respective gate resistors. When transistor Q5 turns on, R9 is switched into the inverting terminal circuit of U2, reducing the voltage at the U2 inverting terminal, which reduces the main power stage 420 output current regulation value to the lower desired level, which in this circuit example is the nominal 60 mA value for a DS1 NIU. Turning on transistor Q4 switches R17 into the U3 inverting terminal circuit reducing the voltage at its inverting terminal so that the output current Io must be reduced substantially below the lower current regulation value to change the control circuit operation back to the initial mode.

When the dual mode span power supply is connected to one or two DS3 NIUs, U1 and transistor Q1 are active and the main power stage 420 output voltage is regulated at 54V. The output current creates a current sense voltage that is not high enough to trip U2 or U3, so transistor Q2 is inactive and not conducting. When the span power output is connected to a DS1 NIU, the regulated output voltage is at about 54V in this example and is greater than the internal clamp voltage of the DS1 NIU of about 20V to about 30V. As a result, the DS1 NIU input clamp pulls the dual mode adaptive power supply into current regulation with the regulation level being the higher initial value Imax (about 600 mA). Imax is greater than the current required to trip the hysteretic current level circuit (Ith), so after the set time delay (typically about 20 ms), the U3 output becomes active (goes high), changing the current regulation level to the lower Ireg (about 60 mA) value suitable for a single DS1 NIU. When the adaptive span power supply is disconnected from the DS1 NIU, the operation of the adaptive power supply will return to its original mode of regulation of the main power stage output voltage.

The illustrated control circuit 500 in FIG. 6 is only one example of a circuit that can be used to implement the new dual mode functionality as described above. A basic algorithm that should be supported in a hardware implementation and applied to different circuits as examples is now set forth.

As a first step, the open circuit voltage is regulated to a maximum voltage. As a second step, the output current is monitored and compared to a maximum value. These first two steps correspond to operating equipment configured for constant voltage input such as DS3 NIUs. As a third step, if the output current increases to the maximum value, then output current is regulated at that value and the output voltage is decreased. As a fourth step, if the output current is regulated at the maximum value for a predetermined time, then the regulated current value is reduced to a lower value with the output voltage being further reduced. Steps three and four as described correspond to operating equipment configured for constant current input such as DS1 NIUs. As a fifth step, the output current remains limited to the reduced level until the load is essentially removed.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An adaptive power supply for span powering in telecommunications, comprising:
    a power circuit; and
    a control circuit connected to the power circuit that receives power, an output voltage sense signal, and an output current sense signal from the power circuit, said control circuit configured to generate a control signal to the power circuit and said control circuit configured to distinguish between a first network interface unit load having a constant voltage input power requirement and a second network interface unit load having a constant current input power requirement that is less than the maximum input current required of the first network interface unit so the adaptive power supply selectively delivers a constant voltage output power for a first network interface unit load and a constant current output at a level below the maximum output current limit for a second network interface unit load.

2. The adaptive power supply according to claim 1, said control circuit comprises a voltage control circuit configured to generate a voltage control signal and current control circuit configured to generate a current control signal, and interconnected together and connected to said power circuit and wherein said voltage control signal and current control signal form together the control signal generated from the control circuit to said power circuit and maintaining a fixed output voltage for constant voltage regulation and powering a first network interface unit load if the output current remains below a threshold current and to limit the output current to a regulated value as constant current regulation for powering a second network interface unit if the initial output current is greater than the threshold current for a time greater than a threshold time value, and wherein said control circuit is configured to increase the power to the power circuit in response to the output current reaching a maximum, thus decreasing power from the power circuit and transitioning from a constant voltage regulation to a constant current regulation.

3. The adaptive power supply according to claim 2, and further comprising a hysteretic current select circuit connected to said current control circuit that sets a regulated current value and comprising a comparator circuit that receives a reference signal and the current sense signal.

4. The adaptive power supply according to claim 1, wherein said voltage control circuit comprises an operational amplifier circuit that receives a reference signal and the voltage sense signal and said current control circuit comprises an operational amplifier circuit that receives a reference signal and the current sense signal.

5. The adaptive power supply according to claim 1, wherein a first interface unit load comprises a DS3 network interface unit load and a second network interface load comprises a DS1 network interface unit load.

6. The adaptive power supply according to claim 1, and further comprising a line filter connected to the output of the power circuit for filtering the power output for use with either first or second network interface unit loads.

7. The adaptive power supply according to claim 1, and further comprising an optical coupler circuit within the main power circuit connecting the control circuit to the power circuit.

8. The adaptive power supply according to claim 1, wherein said power circuit comprises a power transformer, a modulator and drive circuit, a first regulator circuit that derives power from the transformer to provide power to the modulator and drive circuit over a wide operating range, a second regulator circuit that also derives power from the transformer to power the control circuit over a wide operating range.

9. A span power and protection module for span powering a plurality of DS1 network interface units and an "n" number of DS3 network interface units, comprising:
    a plurality of DS1 power supplies that each provide power to a respective DS1 network interface unit;
    an "n" number of adaptive power supplies for span powering one of either a DS1 network interface unit or a DS3 network interface unit, each adaptive power supply comprising:
    a power circuit; and
    a control circuit connected to the power circuit that receives power, an output voltage sense signal, and an output current sense signal from the power circuit, said control circuit configured to generate a control signal to the power circuit and said control circuit configured to distinguish between a first network interface unit load having a constant voltage input power requirement and a second network interface unit load having a constant current input power requirement that is less than the maximum input current required of the first network interface unit so the power circuit selectively delivers a constant voltage output power for a first network interface unit load and a constant current output at a level below the maximum output current limit for a second network interface unit load.

10. The span power and protection module according to claim 9, wherein said DS1 power supplies and adaptive power supplies within said span power and protection module isolate DS1 signals and combine the signals for T-1 style regulated span power.

11. The span power and protection module according to claim 9, wherein said control circuit comprises a voltage control circuit configured to generate a voltage control signal and current control circuit configured to generate a current control signal and interconnected together and connected to said power circuit and wherein said voltage control signal and current control signal form together the control signal generated from the control circuit to said power circuit and maintaining a fixed output voltage for constant voltage regulation and powering a first network interface unit load if the output current remains below a threshold current and to limit the output current to a regulated value as constant current regulation for powering a second network interface unit if the initial output current is greater than the threshold current for a time greater than a threshold time value, and wherein said control circuit is configured to increase the power to the power circuit in response to the output current reaching a maximum, decreasing power from the power circuit and transitioning from a constant voltage regulation to a constant current regulation.

12. The span power and protection module according to claim 11, and further comprising a hysteretic current select circuit within each adaptive power supply and connected to said current sense control circuit that sets a regulated current value and comprising a comparator circuit that receives and compares a reference signal and the current sense signal.

13. The span power and protection module according to claim 9, wherein said voltage control circuit comprises an operational amplifier circuit that receives a reference signal and the voltage sense signal and and said current control circuit comprises an operational amplifier circuit that receives a reference signal and the current sense signal.

14. The span power and protection module according to claim 9, wherein a first network interface unit loads that are connected to an adaptive power supply comprise a DS3 network interface unit load and a second network interface unit comprises a DS1 network interface unit load.

15. The span power and protection module according to claim 9, and further comprising a line filter connected to the output of the power circuit within each adaptive power supply for filtering the power output for use with either first or second network interface unit loads.

16. The span power and protection module according to claim 9, and further comprising an optical coupler circuit within the power circuit within each adaptive power supply and connecting the control circuit to the power circuit.

17. The span power and protection module according to claim 9, wherein said power circuit comprises a power transformer, a modulator and drive circuit, a first regulator circuit that derives power from the transformer to provide power to the modulator and drive circuit over a wide operating range, a second regulator circuit that also derives power from the transformer to power the control circuit over a wide operating range.

18. A method of span powering either a first network interface unit load having a constant voltage input power requirement or a second network interface unit load having a constant current input power requirement less than the maximum required input current of a first network interface unit, which comprises:

providing a power circuit and providing a control circuit connected to the power circuit that receives power therefrom and includes a voltage control circuit and current control circuit interconnected together and connected to said power circuit;

sensing a current output by the power circuit;

comparing the current output with a current threshold value;

configuring the power circuit and voltage control circuit and current control circuit to operate in a current limiting mode when a current threshold value is exceeded for threshold time for powering a second network interface unit; and otherwise, maintaining a voltage mode of operation for the power supply when the current remains less than the threshold value for powering a first network interface unit having a constant voltage input power requirement.

19. The method according to claim 18, which further comprises increasing a control current from the voltage control circuit and the current control circuit to the power circuit and decreasing power from the power circuit and transitioning from a constant voltage regulation to a constant current regulation.

20. The method according to claim 18, which further comprises optically coupling control current from the control circuit to the power circuit.

* * * * *